United States Patent Office 3,249,639
Patented May 3, 1966

3,249,639
SOLID REACTION PRODUCTS OF DECABORANE AND CONJUGATED DIOLEFINS
Eugene J. De Lorenzo, Bronx, N.Y., and Robert V. Wright, North Highland, Calif., assignors to Olin Mathieson Chemical Corporation, a corporation of Virginia
No Drawing. Filed Apr. 20, 1961, Ser. No. 104,473
2 Claims. (Cl. 260—606.5)

This invention relates to the preparation of solid reaction products of decaborane and a conjugated diolefin.

The solid products prepared in accordance with the method of this invention, when incorporated with suitable oxidizers such as ammonium perchlorate, potassium perchlorate, sodium perchlorate ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention, decaborane is reacted with a conjugated diolefin hydrocarbon having from four to five carbon atoms in the presence of a hydrocarbon solvent.

Suitable conjugated diolefins include 1,3-butadiene, 2-methyl-1,3-butadiene (isoprene), and the like.

The ratio of reactants can be varied widely, generally being in the range of 0.1 to 10 moles of decaborane per mole of conjugated diolefin and preferably in the range of 0.5 to 2 moles of decaborane per mole of conjugated diolefin. The ratio of hydrocarbon solvent employed can also be varied widely, generally being in the range of 0.1 to 10 moles of hydrocarbon solvent per mole of decaborane and preferably in the range of 2 to 4 moles of hydrocarbon solvent per mole of decaborane. The reaction is initiated by heating the reaction mixture to a temperature within the range from about 100° C. to about 180° C. and preferably within the range from about 130° to 170° C. The reaction generally requires about 1 to 10 hours depending upon the ratio of the particular reactants and the temperature and pressure employed.

The following example illustrates the process of the invention.

*Example*

Decaborane, .075 mole, and .2 mole of n-pentane were charged to a 150 cc. high-pressure cylinder. The cylinder was then cooled in a liquid nitrogen bath and .075 mole of butadiene was added by condensation. An oil bath was placed around the cylinder and heated slowly to a temperature of 165° C. while the reaction took place. A decrease in pressure was noted as the reaction proceeded. The time required for the reaction was 4¼ hours. The reactor was then cooled to room temperature and disassembled in a nitrogen atmosphere after which the reaction product was removed. The reaction product was a brittle thermoplastic solid containing 42.6 percent boron. Infrared analysis indicated that the product obtained was an alkylated decaborane.

The boron containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

Hydrocarbon solvents suitable for employment in the method of this invention include aliphatic hydrocarbon solvents such as hexane and heptane, aromatic hydrocarbon solvents such as benzene, toluene and xylene and oxygenated organic solvents such as dioxane, ethyl acetate, and diisopropyl ether.

I claim:
1. A method for the preparation of solid reaction products of decaborane and a conjugated diolefin which comprises reacting decaborane and a conjugated diolefin hydrocarbon containing 4 to 5 carbon atoms while the reactants are in admixture with a hydrocarbon solvent.
2. A method for the preparation of solid reaction products of decaborane and 1,3-butadiene which comprises reacting 0.1 to 10 moles of decaborane per mole of 1,3-butadiene at a temperature within the range from about 100° C. to about 180° C. while the reactants are in admixture with n-pentane.

References Cited by the Examiner

UNITED STATES PATENTS 3,103,537    9/1963    Rutkowski _____ 260—606.5

TOBIAS E. LEVOW, *Primary Examiner.*

LEON D. ROSDOL, *Examiner.*

L. A. SEBASTIAN, FRED OWENS,
*Assistant Examiners.*